July 12, 1932.  J. D. McEWEN  1,867,371
CLAMP FOR DERRICK LEGS
Filed July 25, 1928   2 Sheets-Sheet 2
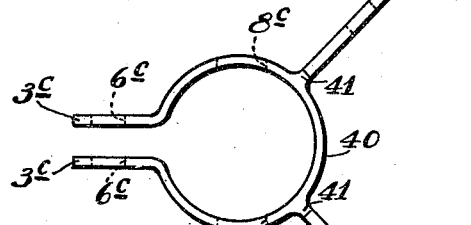
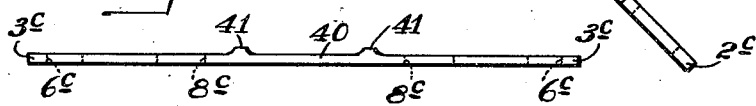
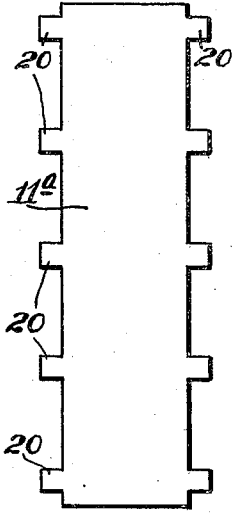
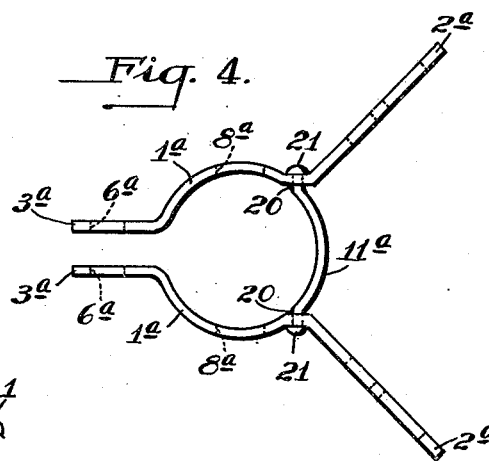
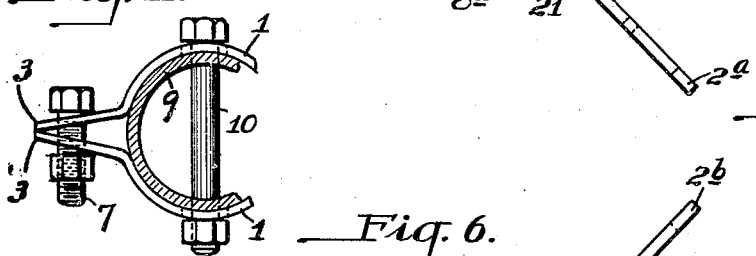
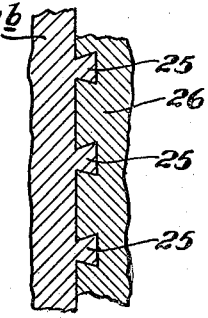
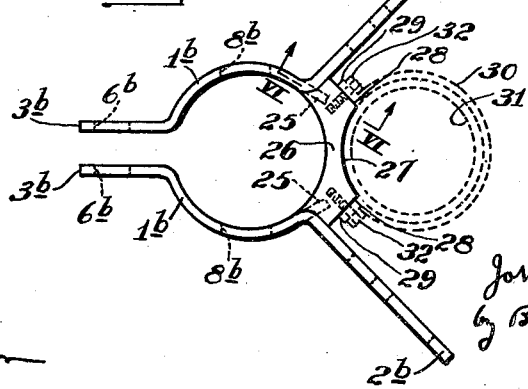
WITNESSES
A B Wallace
Jo Baily Brown
INVENTOR
John D. McEwen
by Brown & Critchlow
his Attys Patented July 12, 1932

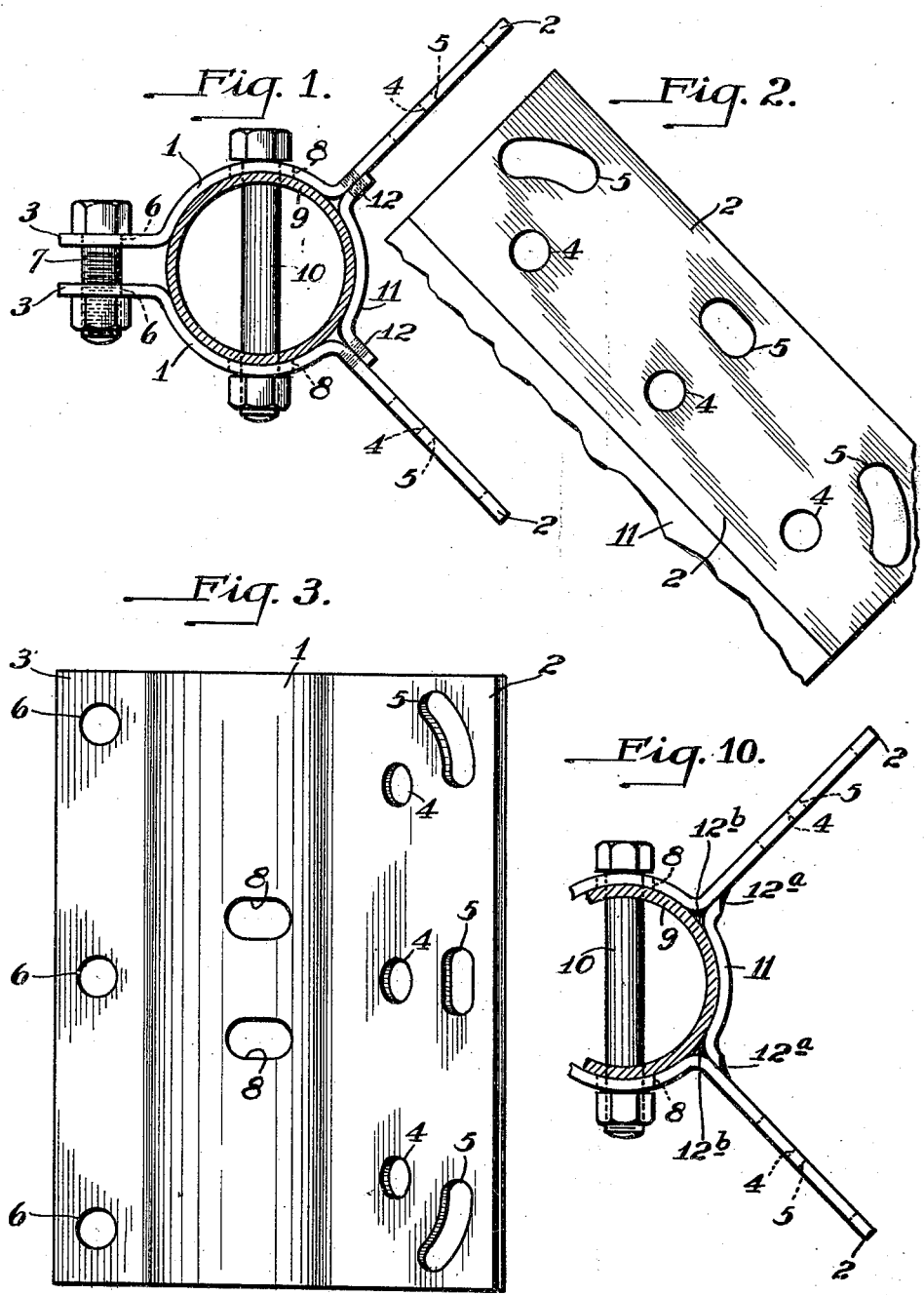

1,867,371

UNITED STATES PATENT OFFICE

JOHN D. McEWEN, OF PITTSBURGH, PENNSYLVANIA, ASSIGNOR TO LEE C. MOORE & COMPANY, INC., OF PITTSBURGH, PENNSYLVANIA, A CORPORATION OF PENNSYLVANIA

CLAMP FOR DERRICK LEGS

Application filed July 25, 1928. Serial No. 295,150.

This invention relates to clamps for connecting adjacent ends of tubular leg sections of derrick structures used in oil well drilling, and the like.

The objects of the invention are to provide a clamp of stronger structure than has heretofore been used and capable of more economic manufacture. An object of the invention is to make the major portion of the clamp of one or more rolled steel plates. Another object is to avoid the necessity of striking up flanges from the body of the plates for attachment of girts and braces to the clamps formed thereof. Another object is to provide a multi-plate clamp in which the several parts may be manufactured to best advantage, the whole being rigidly united by welding, casting, or riveting, to give the strength of a unitary structure, with a reduction of cost. Other objects and advantages will be apparent to those familiar with the art from the specification and drawings.

Referring to the drawings, Fig. 1 is a plan view of a preferred form of the clamp; Fig. 2 is a partial side view thereof, showing the perforations of one of the radial flanges; Fig. 3 is a side elevation of the clamp showing one of the main plate members complete; Fig. 4 is a plan view of a modification in which the connecting plate is riveted to the main pair of plates; Fig. 5 is a view of the modified connecting plate of Fig. 4; Fig. 6 is a modification in which the main plates are connected by a cast member which is adapted to support an attachment for a releg structure; Fig. 7 is a partial section on the line VI—VI of Fig. 5; Fig. 8 is a modification showing the entire tubular portion of the clamp formed from a single ribbed plate with the radial flanges formed of separate plates welded thereto; Fig. 9 is an end view of a special plate for forming the tubular portion of the clamp of Fig. 8; Fig. 10 is a partial view similar to that of Fig. 1, showing a modified form of welding; and Fig. 11 is a partial view similar to that of Fig. 1, showing the clamping flanges as compressed after considerable usage.

The derricks used in drilling wells for oil, gas, water, etc., are now preferably made of metal. The tubular type has been known for many years, and, with the necessity in recently developed oil fields of deep wells, this form of metal derrick has become increasingly valuable, because of its great strength and durability. As the wells have become deeper, and the power plants for drilling them more highly developed, there has been increased necessity for derrick strength.

Such derricks are ordinarily formed of four corner posts arranged in pyramidal order, connected together by bolted-on transverse girts and braces, the legs being formed of abutting aligned sections of steel tubing, the adjacent ends thereof being connected by clamps. This latter element is the portion of such derricks to which the present invention is addressed.

Derricks of this kind are made of standard interchangeable parts, so that they may be erected and dismantled without special machinery or tools, and so that any broken, damaged, or lost parts may be readily replaced from stock. In erecting the derricks the structure is raised from the ground upon itself, without scaffolding, two or more workmen building it up, or taking it down progressively from bottom to top, or vice versa.

With the modern tendency to heavier structures, caused by deeper drilling and more powerful drilling rigs, the strength of all parts has become increasingly important. The present clamp is adapted to obviate some of the weaknesses of prior pressed steel clamps. For example it does away with the weakening of such clamps resulting from the striking up of large portions thereof for the purpose of forming flanges for the attachment of girts and braces. That method of manufacture has been prevalent in the best clamps of the prior art.

The present structure permits the forming of the major portions of the clamp from standard structural plate material, sheared to size, perforated, and bent to shape by suitable dies operating in a single direction, and without unduly straining the metal in the forming thereof. Since no part of these plates is struck up or cut out to form attachment flanges for girts and braces, a wide area is provided in which perforations for receiving diametric through-bolts may be made, without materially weakening the clamp structure.

Referring to Fig. 1 of the drawings, the preferred form of the invention is illustrated as comprising a pair of similar complementary plates 1, 1. These have the portions intermediate their lateral edges formed into arcuate segmental tubular shape, adapted to seat upon a concentric tubular leg section therein when in operative position. Adjacent lateral edges of the main plates are bent outwardly to form radial flanges 2, 2, the other two lateral edges of the main plates being bent to form parallel spaced-apart flanges 3. The radial flanges have an inner series of circular perforations 4, and an outer series of arcuate slots 5, the latter being concentric with the holes 4, so that when girts and braces of the tower structure which are adapted to be attached to the flanges 2 by means of the perforations referred to, are in position, the inner ends being retained by attachment bolts passing through the holes 4, the outer ends will have a considerable range of vertical adjustment because of the play of attachment bolts in the arcuate slots 5.

The flanges 3 on the other lateral edges of the plates, herein referred to as the parallel flanges, are also perforated, having oval, square or preferably circular holes 6 therein. These are adapted to receive compression bolts 7 for drawing the clamp tight upon the adjacent ends of tubular leg sections 9, as indicated in Fig. 1. Preferably the flanges 3 are made wide enough so that after they have been used a few times their outer edges may contact as shown in Fig. 11. Thereafter all clamping force of the bolt will be effective against the leg section, as the outer ends of flanges 3, 3 will fulcrum on each other.

The arcuate or segmental tubular portions of the pairs of plate members 1 have perforations 8 situated a little distance above and below the middle transverse plane of the clamp. These are for the purpose of receiving through-bolts 10 adapted to pass through the clamp diametrically and through the adjacent ends of the tubular leg sections, which normally meet in the median transverse plane of the clamp. These perforations for the through-bolts are preferably elongated as shown. This shape is for the purpose of making it easier to get the bolts through the opposite side of the clamp from which it has been inserted. One advantage of the present form of multi-plate clamp is that it provides ample space in the clamp body for these elongated through-bolt openings without unduly weakening the clamp structure.

The main plate members 1 are made in similar pairs, so that they are interchangeable in making up the clamp, it only being necessary to turn any main plate member end-for-end to make it into the cooperating plate member for a similar one.

The pair of main plate members 1, 1, are connected rigidly to form the clamp by means of a third plate 11. This also is sheared from standard structural plate stock, bent to form an intermediate segmental tubular portion for engaging the tubular leg 8. The lateral edges of this third plate member are bent outward radially and are adapted to lie against and parallel with the bases of the radial flanges 2 of the main plate members. These parallel abutting flanges are then welded together electrically as indicated at 12, 12, of Fig. 1, or 12a, 12a, of Fig. 10. In Fig. 1 the plates are spot welded at three or more points. In Fig. 10 the plates are arc welded along the entire outer edge of plate 11, and in addition they are welded at the top and bottom on the inside as indicated at 12b, 12b. The result is the forming of three plates 1, 1, and 11 into a rigid integral plate structure having a tubular portion for engaging tubular leg sections, having outstanding radial flanges for engaging girts and braces, and having outstanding flanges 3, 3, for receiving compression bolts 7 for firmly securing the clamp upon the ends of the leg sections.

In erecting such derricks a clamp is slipped down on the top of a section of a leg and the lower through-bolt put through the clamp and through the top of the leg section, the compression bolts are put in and the lowermost of the compression bolts 7 is tightened up somewhat. This is done on the ground. This leg section with clamp attached to the upper end is then hoisted to the support of the derrick and its free end seated in the open clamp of a previously positioned section. Girts and braces leading from the other legs of the derrick are attached by means of bolts through the perforations 4 and 5, then another tubular leg section with clamp attached to its upper end is seated upon the first and inside the clamp, resting upon the upper end of the first mentioned section. A second through bolt is put through the clamp and through the lower end of the second leg section, the second and third compression bolts 7 are inserted and drawn tight, and so on.

Figs. 4 and 5 show a modification in that the main plates 1a, 1a, while of substantially the same shape and arrangement as the plates 1 of Fig. 1, are perforated at and through the bases of the radial flanges 2a, 2a. A third plate 11a has tongues 20 formed in each lateral edge, adapted to extend through the perforations of the plates 1a. These tongues then have their terminals upset beyond the plates 1a to form riveted heads 21, as shown in Fig. 4. The intermediate portion of the plates 11a is bent into tubular segmental form so as to fit on and concentric with the derrick leg sections to be enclosed therein.

Figs. 6 and 7 show another modification in that the plates 1b have dove-tail tongues 25 struck inwardly from the radial flanged portions 2b, these tongues extending in substantial tangential relation to the segmental portion of the plates 1b. In forming this modified clamp the plates 1b are set in position and held while the member 26 is cast around the tongues, in a suitable mold, forming a rigid connection between the plates 1b and enclosing the tongues 25 in the casting 26. The inner portion of this cast connection-member is of segmental tubular form continuous and concentric with the curved portions of the plates 1b. The outer portion of the cast member 26 has an arcuate longitudinal portion 27, adapted to seat a tubular releg section. Straight faces 28 on the outer side of the casting 26 are adapted to receive terminal flanges 29 of a clamping band 30 adapted to enclose the releg tube section 31. The casting is bored to receive screws 32 adapted to extend through the flanges 29 and to be threaded into said bores in the casting for retaining the band 30 thereto. The plates 1b are provided with openings 8b positioned as and for the purpose of the openings 8 of Fig. 3.

Another modification is shown in Figs. 8 and 9, wherein a clamp is illustrated as made up of a special plate 40 having longitudinal parallel spaced apart ribs 41 on one side thereof. The plate 40 is bent upon itself as shown in Fig. 8, the lateral edges being bent outwardly to form parallel spaced apart flanges 3c, having perforations 6c, for receiving compression bolts as in the other forms of the clamp. The ribs 41 are positioned on the side of the clamp opposite the compression flanges 3c. Flange-plates 2c are butt-welded to the ribs 41 so as to extend radially therefrom. These flange-plates are perforated to provide holes for receiving attachment bolts as shown in Fig. 2. Through-bolt openings 8c are provided on each side of the median plane of the clamp. By this modification the main clamp body is made of a single plate, and the flanges for attaching girts and braces are provided by separate welded-on plates without the necessity of weakening the clamp body by striking up or cutting out any portion thereof. The butt-welded flange plates are thus made integral with the main plate. The result is a very strong, comparatively light, all-plate unitary clamp.

Distinct advantages from the point of view of manufacturing expediency, cost, and strength, of these clamps made mostly of rolled structural plate stock will be apparent to those familiar with the art.

I claim:

1. A clamp for joining tubular leg sections of oil well derricks, comprising a pair of similar plates pressed intermediate their lateral edges to form tubular segments and having their lateral edges bent to form outstanding flanges, said flanges being perforated to receive attachment bolts, and an intermediate member permanently and rigidly connecting the plates to form a unitary clamp.

2. A clamp for tubular leg sections of oil well derricks, comprising a pair of similar plates pressed intermediate their lateral edges to form tubular segments and each having one lateral edge bent radially to form an outstanding flange for attachment of girts and braces, the two radial flanges being connected by a third segmental plate having its lateral edges bent outward radially to form flanges adapted to bear against the radial flanges of the first mentioned plates, said contacting flanges being welded together to unite the three plates into a unitary clamp.

3. A clamp for tubular leg sections of oil well derricks comprising a pair of similar plates pressed intermediate their lateral edges to form tubular segments and each having one lateral edge bent radially to form an outstanding flange for attachment of girts and braces, the other lateral edges being bent to form parallel flanges adapted to be connected by clamping bolts, the two radial flanges being connected by a third segmental plate having its lateral edges bent outward radially to form flanges adapted to bear against the radial flanges of the first mentioned plates, said contacting flanges being welded together to unite the three plates into a unitary clamp.

In testimony whereof, I sign my name.

JOHN D. McEWEN.